United States Patent [19]

Weimer

[11] 3,789,240

[45] Jan. 29, 1974

[54] BUCKET BRIGADE SCANNING OF SENSOR ARRAY

[75] Inventor: Paul Kessler Weimer, Princeton, N.J.

[73] Assignee: RCA Corporation, New York, N.Y.

[22] Filed: May 26, 1972

[21] Appl. No.: 257,095

Related U.S. Application Data

[62] Division of Ser. No. 83,923, Oct. 26, 1970, Pat. No. 3,683,193.

[52] U.S. Cl. ....... 307/223 C, 307/221 C, 307/221 D

[51] Int. Cl. ........................................... H03k 23/22

[58] Field of Search ......... 307/221 D, 221 C, 223 C

[56] References Cited

UNITED STATES PATENTS

| | | | |
|---|---|---|---|
| 3,564,300 | 2/1971 | Henle | 307/279 |
| 3,660,697 | 5/1972 | Berglund | 307/304 |
| 3,252,009 | 5/1966 | Weimer | 307/221 D |
| 3,474,260 | 10/1969 | Frohbach | 307/221 D |
| 3,621,283 | 11/1971 | Teer | 307/221 D |

FOREIGN PATENTS OR APPLICATIONS

| | | | |
|---|---|---|---|
| 6,805,705 | 10/1969 | Netherlands | 317/235 |

*Primary Examiner*—John S. Heyman

*Attorney, Agent, or Firm*—H. Christoffersen, Henry I. Schanzer

[57] ABSTRACT

A sensor array having photosensitive elements formed as an integral part of each stage of a shift register chain. Each stage has charge storage means. The photosensitive elements are coupled to the charge storage means for discharging them as a function of externally applied photo signals and, consequently, developing charge deficits in said charge storage means. The shift register, in response to a clocking signal, transfers the charge deficits from one stage to the next along the chain producing a serial output signal at an output terminal.

5 Claims, 5 Drawing Figures

BUCKET BRIGADE SCANNING OF SENSOR ARRAY

This is a division of U.S. Pat. application Ser. No. 83,923, filed Oct. 26, 1970 now U.S. Pat. No. 3,683,193.

BACKGROUND OF THE INVENTION

Sensors such as image sensor arrays have to be periodically scanned to sample (extract) the information contained in the elements of the sensor. To optimize the sensor-scan generator interface, the scan generator should be as close as possible to the array. To achieve this proximity, the stages of the scanner should as a first requirement be very simple to enable their manufacture with a density comparable to that of the elements of the array.

In two recent articles, one by F. L. Sangster, and K. Teer entitled, "Bucket Brigade Electronics — New Possibilities for Delay, Time-Axis Conversion, and Scanning" (IEEE Journal of Solid-State Circuits, Vol. SC 4, No. 3, pp. 131–136, June 1969) and the other by F. L. Sangster entitled, "Integrated MOS and Bipolar Analog Delay Lines Using Bucket Brigade Capacitor Storage," (IEEE International Solid State Circuits Conference p; 74–75 of Digest of Technical Papers), there is disclosed an analog delay line known as the "Bucket Brigade" which is operable as an analog shift register. The bucket brigade, whose operation is based on the concept of transfer of charge deficit from stage to stage, may be fabricated to form a simple high density shift register which is highly suitable to scan a sensor array.

The bucket brigade, taught by Sangster, may be modified to operate as a parallel output shift register-scan generator which can be connected externally to the rows and columns of a sensor array having row and column address strips. Since the bucket brigade is simpler than previously proposed shift registers, this approach represents a significant simplification of the circuits required to scan arrays. However, Sangster the bucket brigade includes two transistors per stage and it would be desirable if the register could be made even simpler so as to include a single transistor per stage.

DETAILED DESCRIPTION OF THE INVENTION

For ease of presentation, N type insulated gate field-effect transistors (IGFETs) of the enhancement type and specifically IGFETs having a metal gate overlying the oxide channel and known as MOS transistors are used in the figures to illustrate the invention. However, it is to be understood that any other suitable type of transistor—e.g., depletion type IGFETs, bipolar transistors, or junction field-effect devices—may be used to practice the invention. The introductory discussion below of the IFGET transistors illustrated in the various figures is for the purpose of assisting the reader more easily to follow the detailed description of the circuits.

1. The devices used have a first electrode and a second electrode referred to as the source and drain and defining the ends of a conduction path, and a control electrode (gate) whose applied potential determines the conductivity of the conduction path. For the P-type IGFET the source electrode is defined as that electrode of the first and second electrodes having the highest potential applied thereto. For an N-type IGFET, the source electrode is defined as that electrode of the first and second electrodes having the lowest potential applied thereto.
2. The devices used are bidirectional in the sense that when an enabling signal is applied to the control electrode, current can flow in either direction in the conduction path defined by the first and second electrodes.
3. For conduction to occur, the applied gate-to-source potential ($V_{GS}$) must be in a direction to forward bias the gate with respect to the source and must be greater in magnitude than a given value which is defined as the threshold voltage ($V_T$). Thus, where the applied $V_{GS}$ is in a direction to forward bias the transistor but is lower in amplitude than $V_T$ the transistor remains cut off and there is substantially no current flow in the conduction channel. [Note that this is also applicable to bipolar devices, where for conduction to occur the base must be forward biased with respect to the emitter by a larger signal than the base-to-emitter junction off-set voltage ($V_{be}$)].
4. When used as a source (or emitter) follower, the voltage ($V_S$) at the source electrode "follows" the signal ($V_G$) applied at the gate but is offset with respect to the gate voltage by an amount equal to the threshold voltage ($V_T$) of the device, [$V_S = V_G - V_T$].

To facilitate the explanation to follow, especially that part of the explanation dealing with the operation of the circuit, it is assumed that $V_T$ is equal to zero. Though not necessarily true, such an assumption does not alter the mode of operation since $V_T$ is a constant and provides a D. C. offset which only affects the d. c. bias of the chain of registers.

Figure 1:
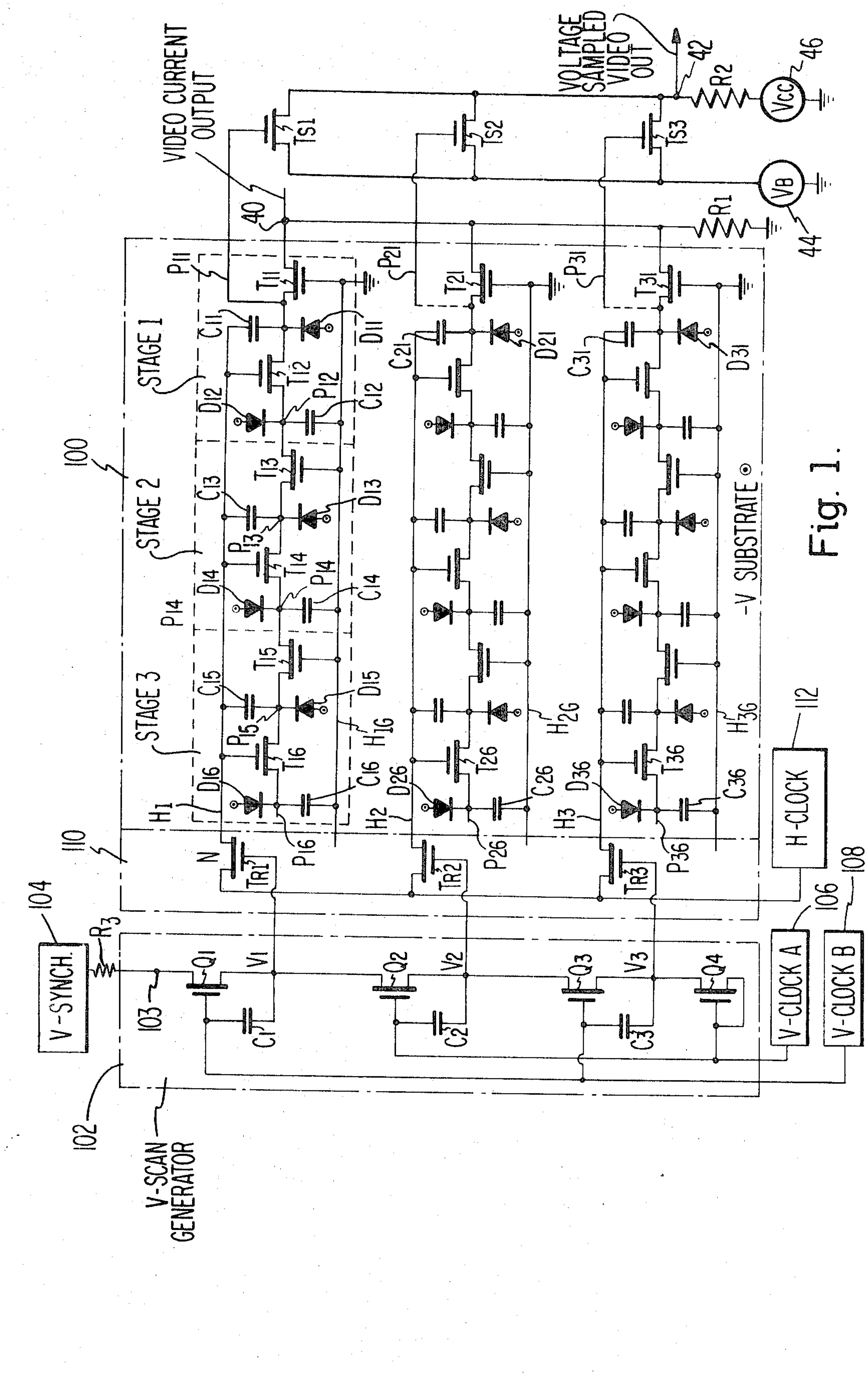
FIG. 1 is a schematic diagram of an image sensor array embodying the invention.

The system of FIG. 1 includes: 1) An image sensor 100; 2) the means for periodically scanning the sensor comprising V-scan generator 102 pulsed by V-synch generator 104 and clocked by V-clock generators A and B (106, 108) and H-clock distributor 110 coupled between the H-clock generator 112 and the sensor 100; and 3) output circuits for extracting the video signals generators by the sensor.

Sensor arrays embodying the invention may have N rows, each row of the array having M stages where M and N represent integers which are greater than zero and which need not be equal. For ease of illustration, the sensor 100 of FIG. 1 is shown having three rows and six transistors per row. Each row has two conductors; one conductor ($H_{1G}$, $H_{2G}$, $H_{3G}$) of each row is connected to ground potential and the other one of the two conductors ($H_1$, $H_2$, $H_3$) of each row is connected through a transistor switch ($T_{R1}$, $T_{R2}$, $T_{R3}$) to H-clock generator 112. The transistor switches ($T_{R1}$, $T_{R2}$, $T_{R3}$) are bidirectional transmission gate transistors having one end of their conduction paths connected to H-clock generator 112, the other end of their conduction paths connected to a different one of the row conductors ($H_1$, $H_2$, $H_3$), and their gate electrodes connected to a different one of the outputs ($V_1$, $V_2$, $V_3$) of the V-scan generator 102.

Each row of the sensor 100 includes a line of transistors having their conduction paths connected in series. For example, row one includes transistors $T_{11} \ldots T_{16}$. The drain of one transistor is connected to, or is integral with, the source of the adjacent transistor. Each of the source-drain regions forms a common region or junction point (e.g., $P_{11}$, $P_{12} \ldots P_{16}$), denoted by a two digit numeral subscript. The first digit denoted the row and the second digit the order of the element along the row. The gate of every other transistor (the even numbered transistors in FIG. 1) is returned to a pulsed conductor ($H_1$, $H_2$, $H_3$), and the gates of the remaining transistors, (the odd numbered transistors in FIG. 1), are connected to the grounded conductor ($H_{1G}$, $H_{2G}$, $H_{3G}$).

Coupled between the gate and drain electrode of each transistor is a capacitor which may be a discrete and/or a distributed component. The capacitor performs a crucial role in the operation of the "Bucket Brigade" by storing charge during one phase of the clock signal and by transferring charge during the other half of the clock signal. In circuits embodying the invention, the capacitor plays the still further role of developing a charge deficit which is proportional to a photo signal. It is the signal (charge deficit) developed across the capacitors which is read out when the array is scanned.

At each of the source-drain regions of the sensor there is a photo diode ($D_{11} \ldots D_{36}$). The diodes are operated in the reverse biased condition by returning their anodes to a potential (not shown) which is more negative than the most negative potential applied to their cathodes. In the reversed-biased condition, the photo diodes behave as current generators allowing a current to flow in the reverse direction (cathode to anode) which is proportional to the intensity of the light incident thereon.

V-scan generator 102 includes a line of transistors $Q_1 \ldots Q_4$ having their conduction paths connected in series. The line of transistors resembles a row of the image sensor except that there is no photo sensitive element connected to the nodes of the scan generator 102. Scan generator 102 has one transistor per stage and the drain of each transistor except the last forms an output point ($V_1$, $V_2$, $V_3$) which is connected to the gate of a different one of the transmission gate transistors ($T_{R1}$, $T_{R2}$, $T_{R3}$). The gate of each transistor is coupled through a capacitor ($C_1$, $C_2$, $C_3$) to its drain.

The input end 103 of the series path of V-scan generator 102 is connected to a vertical synch generator 104 which produces a pulse which initiates the readout cycle. The last output point ($V_3$) of the chain is connected through the conduction path of transistor $Q_4$ to V-clock A, 106. The gate electrode of every other transistor (e.g., $Q_1$, $Q_3$) is connected to one of two clock generators (e.g., V-clock B, 108) and the gate electrodes of the remaining transistors of the chain (e.g., $Q_2$, $Q_4$) are connected to a second clock generator (e.g., V-clock A, 106).

Two output circuits for extracting the signals from the image sensor are illustrated in FIG. 1. In one circuit, current sampling is achieved by connecting the drains of the first or right-most transistor ($T_{11}$, $T_{21}$, $T_{31}$) of each row in common to an output terminal 40 which is returned through resistor $R_1$ to ground potential. As described below, a current flows through $R_1$ during the negative going cycle of the H-clock which restores the successive charge deficits entering the first stage of each row. By sensing the current required to restore the charge deficit, a video current output signal is obtained at output terminal 40. Note that since each row is sequentially sampled, the rows of the array may be tied together to provide a multiplexed output.

In the second output circuit, voltage-sampling transistors ($T_{S1}$, $T_{S2}$, $T_{S3}$) have their gate electrodes respectively connected to the source of the first transistor of each row to measure the signal voltage in the moving charge pattern and convert the voltage modulation into a current flowing through resistor $R_2$ to produce an output at output terminal 42. The source electrodes of the voltage sampling transistors are connected in common to a biasing source of potential 44 of amplitude $V_B$ and their drain electrodes are connected in common to output terminal 42 which is connected through resistor $R_2$ to a source of operating potential 46 of amplitude $V_{CC}$.

Figures 2, 3:
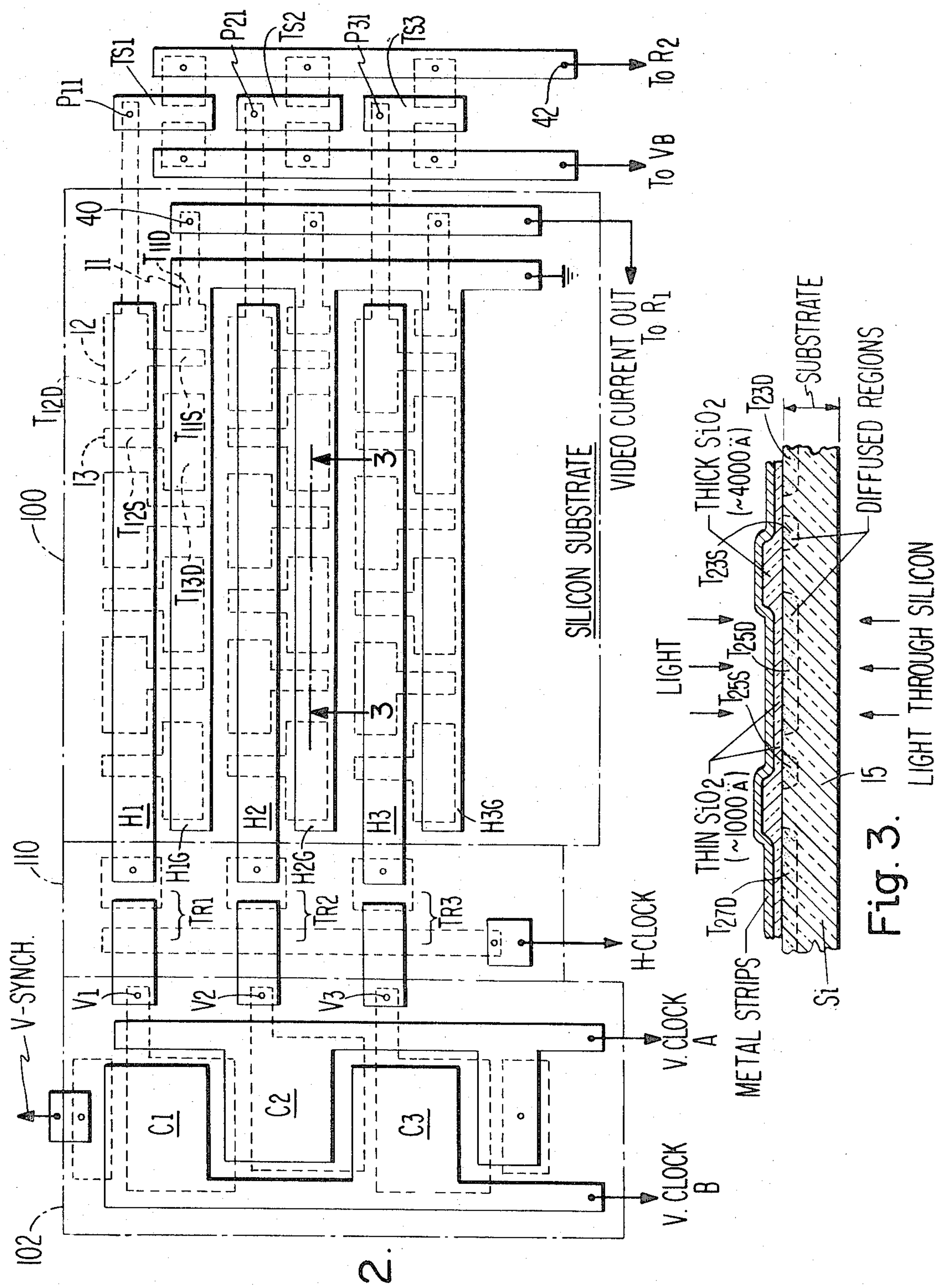
FIG. 2 is the layout of a monolithic integrated circuit version of the circuit of FIG. 1.
FIG. 3 is a cross section of a portion of the circuit of FIG. 2 taken along the lines 3—3 thereof.

The circuit of FIG. 1 may be constructed as shown in FIGS. 2 and 3. FIG. 2 is the layout of a monolithic integrated circuit version of the circuit of FIG. 1.

In FIG. 2 the outlines of the diffused source and drain regions in the silicon are shown by dotted lines. The outline of the metallized gates and connecting strips (all the overlying metallization) are indicated by the solid lines. In FIG. 2, it may be observed that the source of a transistor and the drain of an adjacent transistor are formed by, and are part of, the same diffused area. Thus, for example, the area marked 11 is the drain of transistor $T_{11}$, the area marked 12 is both the source of transistor $T_{11}$ and the drain of transistor $T_{12}$, and the area marked 13 is both the source of transistor $T_{12}$ and the drain of transistor $T_{13}$. The gate electrodes and their associated row conductor are formed from a single metal strip running the length of the row.

Of further interest in the layout of FIG. 2 is the formation of the gate-to-drain coupling capacitors ($C_{DG}$). One of the prime considerations in the design of a bucket brigade type circuit is that $C_{DG}$ be much larger than the capacitance between the gate and the source ($C_{GS}$). This is achieved as illustrated for the sensor 100 by having each diffused region (shown with dotted lines) comprised of a fat rectangular portion and a thin rectangular portion. The fat portion normally acts as the drain of the transistor and provides a large area over which the metal strip (gate) overlaps and the thin rectangular portion normally acts as the source and provides considerably less area. This asymmetry is necessary because the charge deficit (which represents the signal) is always transferred toward the larger capacitance. At the same time the direct capacitive coupling between the source and the drain should be kept to a minimum. The larger capacitance between the gate and the drain is readily achieved by allowing the metal gate to overlap the diffused drain region. This is most evident from an examination of the areas marked $C_1$, $C_2$, $C_3$, in FIG. 2, which represent the $C_{DG}$ of the V-scan generator 102.

In FIG. 2 the oxide insulator is not shown but is assumed to cover the entire silicon surface except where windows have been etched in order to make contact (shown by black dots in FIG. 2) to the diffused regions. The oxide insulator is made thinner in the transistor channels and over the drain regions (to increase $C_{DG}$), but is thicker in the areas where the metal strips cross over the source electrodes or over portions of the semiconductor where no transistor action is desired. It should be noted that in the layout of FIG. 2 a single layer of metallization is required to complete the entire sensor array including the vertical scan generator 102, the H-clock distributor switches, and the video output transistors ($T_{S1}$, $T_{S2}$, $T_{S3}$).

Formation of the photodiodes is shown in FIG. 3, which is a cross-section through 3—3 of the layout of FIG. 2. The diodes may be formed as part of the diffused source and drain regions embedded in the substrate. For the N-channel MOS transistors, the diffused regions ($T_{23D}$, $T_{23S}$, $T_{25D}$, $T_{25S}$ . . . ) may be of N-conductivity type material and the substrate 11 may be of P-conductivity type material. Each of the N-type regions thus forms a PN junction with the substrate in which it is embedded which in effect forms a diode. Each diffused region thus forms a source ($T_{23S}$, $T_{25S}$) or a drain ($T_{23D}$, $T_{25D}$) for a lateral type MOS transistor and with respect to the substrate forms a diode.

Figure 4A:
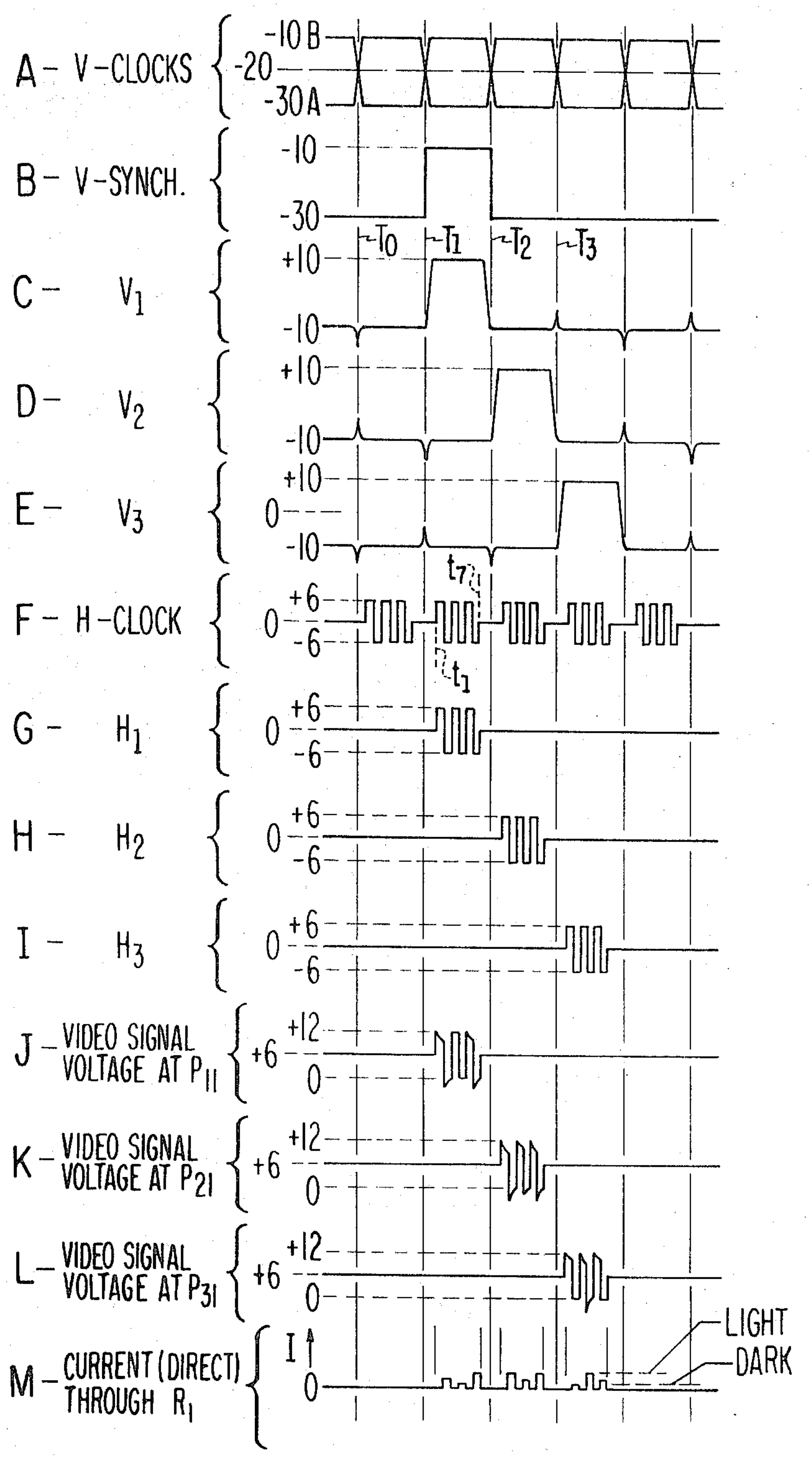
FIGS. 4A and 4B are diagrams showing typical waveforms of the circuit of FIG. 1.
Figure 4B:
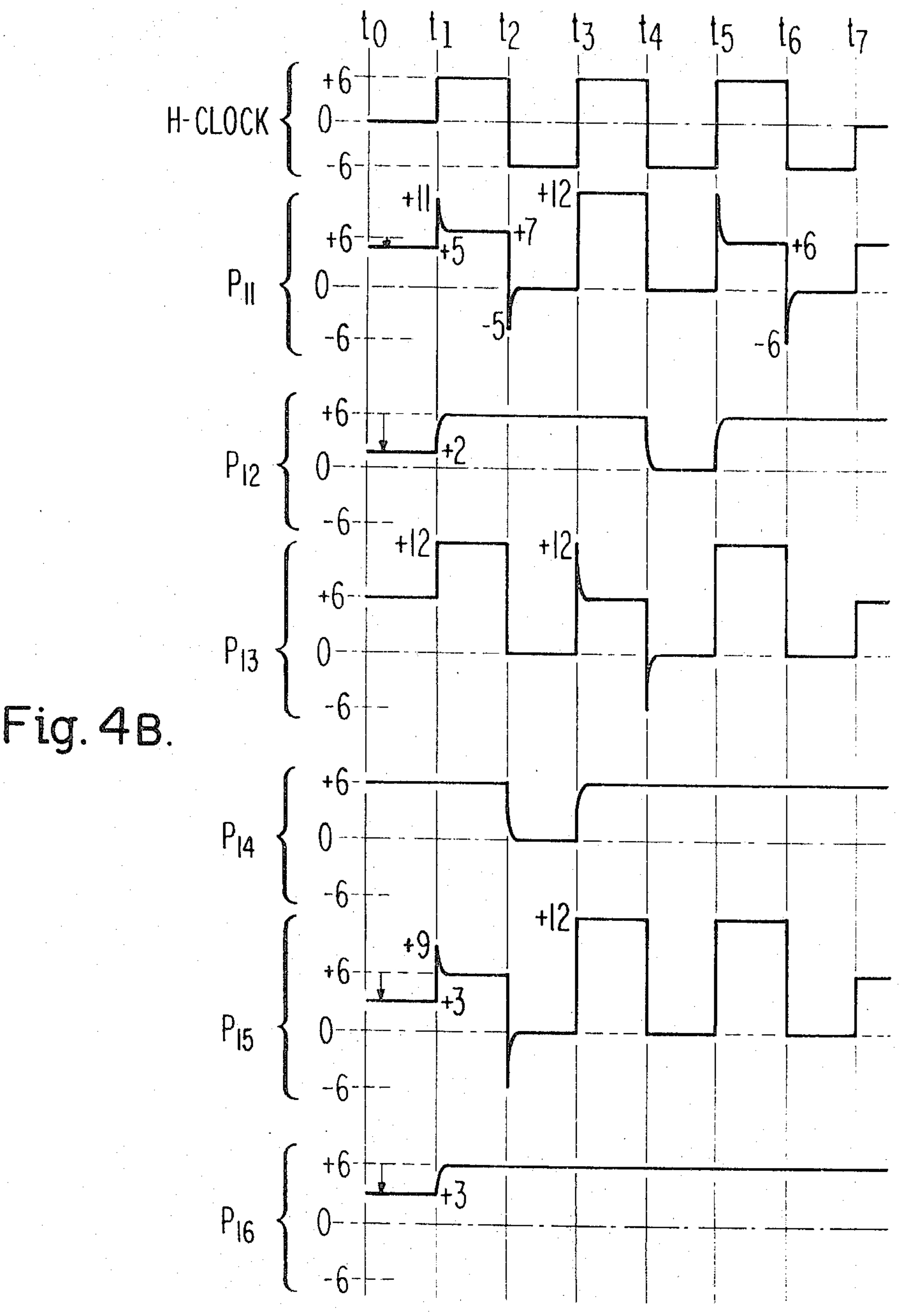

A readout and recharge cycle is initiated by the application of a V-synch pulse of the type shown in waveform B of FIG. 4A to terminal 103 of V-scan generator 102 which then produces a positive going pulse at $V_1$ (waveform C of FIG. 4A) which enables transistor $T_{R1}$. With transistor $T_{R1}$ "closed" bipolar pulses generated by H-clock generator 112 are applied to the $H_1$ line. The H-clock pulses (wave-form F, FIG. 4A) are bipolar, going a positive 6 volts and then a negative 6 volts with respect to a point of reference potential (ground).

On the first positive half cycle of a horizontal clock pulse (H-clock), the information contained in the two capacitors of each stage of array 100 is combined to form a single signal whose potential is equal to the sum of the individual photodiode signals. These signals are then serially propagated from stage to stage and may be read out either as a voltage sampled output or, half-a-clock cycle later, as a current sampled output at terminal 40.

Sometime following the sampling of row 1, a positive pulse is produced at terminal $V_2$, enabling transistor $T_{R2}$ to couple conductor $H_2$ to H-clock generator 112. In the meantime, the pulse at $V_1$ goes negative, disabling transistor $T_{R1}$. Following the sampling of the second row of the sensor, the process is repeated (see waveform E of FIG. 4A) with the transmission gate $T_{R3}$, coupling the next conductor $H_3$, being enabled. This process is continued until all the rows of image sensor 100 are read out.

Any number of prior art scan generators (shift registers) may be used to sequentially apply pulses to the gates of the transmission gate transistors ($T_{R1}$ . . . $T_{R4}$). However, a bucket brigade V-scan generator 102 such as shown in the FIG. 1 and constructed as shown in FIG. 2 is preferred, since it is compatible in terms of simplicity of design and technology with the sensor 100. By appropriate choice of the voltage levels of the V-synch pulse shown in waveform B of FIG. 4A and also by appropriate choice of the voltage levels of the V-clock, a scan generator requiring but a single transistor per stage may be constructed.

The A and B V-clock outputs are complementary, each clock producing pulses of 20 volt amplitude which vary ±10 volts about a negative 20 volt level. Also, the level of the V-synch output is normally about −30 volts until $T_1$ time at which point an initiate pulse is generated and the output makes a transition from −30 volts to −10 volts.

Prior to time $T_1$ while the V-synch output is held at −30 volts, each of the output terminals ($V_1$, $V_2$, $V_3$, $V_4$) remains at a steady state value of approximately −10 volts (except for periodic transients of 20 volts amplitude in the positive and negative direction).

Consider the potentials at terminals $V_1$, $V_2$, and $V_3$ at time $T_o$ (the half-cycle prior to $T_1$). The V-clock (B) makes a transition to its most negative value (−30 volts) while the V-clock (A) makes a transition to its most positive value (−10 volts). The potential at $V_1$ and $V_3$ is momentarily carried to −30 volts by means of the capacitive coupling of $C_1$ and $C_3$, respectively, and $V_2$ is momentarily carried to +10 volts by means of the capacitive coupling of $C_2$. Transistor $Q_2$ with −30 volts at its source ($V_1$), +10 volts at its drain ($V_2$) and −10 volts at its gate (A-clock) conducts in the source follower mode restoring the potential at $V_1$ to approximately −10 volts and simultaneously (by transfer of charge deficits to $C_2$) reduces the potential at $V_2$ to approximately −10 volts. Concurrently transistor $Q_4$ also operating in the source follower mode returns $V_3$ to the −10 volt level.

At time $T_1$, the V-clock (A) is switched to its most negative value (−30 volts), the V-clock (B) is switched to its most positive value (−10 volts) and the V-synch output is switched to −10 volts. $V_1$ is carried to +10 volts by capacitive coupling through $C_1$ and remains at that level until $T_2$ because transistor $Q_1$ has −10 volts on its gate and on its source and is therefore non-conducting and transistor $Q_2$ with −30 volts on its gate is also non-conducting.

At time $T_2$,V-clock (A) is switched positively to −10 volts and V-clock (B) is switched negatively to −30 volts. The potential at $V_1$ is carried negatively by capacitive coupling through $C_1$ from +10 to −10 volts. The potential at $V_2$ is carried positively from −10 to +10 volts by capacitive coupling through $C_2$ to the V-clock (A) and remains at that potential until $T_3$. Transistor $Q_2$ does not conduct and no charge is transferred from $V_2$ to $V_1$ during this period ($T_2$–$T_3$) because $V_1$ (which is the source of transistor $Q_2$) is already at the potential (−10 volts) of the gate of transistor $Q_2$ which is at the V-clock (A) potential (−10 volts).

At time $T_3$,V-clock (A) goes to −30 volts and V-clock (A) goes to −10 volts. The potential at $V_1$ goes to +10 volts (by the capacitive coupling of $C_1$) but since V-synch is now at −30 volts $V_1$ is drawn back to −10 volts due to resistor $R_3$ which is chosen to introduce the required amount of charge into capacitor $C_1$ to return $V_1$ to −10 volts. The potential at $V_2$ is carried from +10 volts to −10 volts by capacitive coupling through $C_2$ to the V-clock (A). The potential at $V_3$ goes to +10 volts by capacitive coupling of $C_3$ and remains at that level until $T_4$ since transistor $Q_4$ does not conduct having −10 volts at its gate and −10 volts at its source ($V_2$).

Thus, a positive-going pulse is transferred down the register advancing from one transistor to the next on each half cycle of the clock. Charge is transferred on each cycle through every transistor except where the positive going pulse occurs. By proper choice of clock voltages and of the polarity and magnitude of the synch input pulse a parallel output scan generator has been obtained which requires only one transistor and one capacitor per stage. However, operation of a bucket brigade in this manner requires excellent charge storage at each element and a high value of transfer efficiency from one stage to the next in order for the pulse not to be degraded in amplitude or width after many stages.

As may be seen in waveforms C, D, and E of FIG. 4A, there are spikes produced at the $V_1$, $V_2$, and $V_3$ outputs corresponding to the transitions of the V-clocks. Normally the positive going spikes are highly undesirable since they turn on the transmission gate transistors connected to the spike producing outputs. However, as may be seen from waveform F of FIG. 4A, the H-clock is at zero volts when the spikes (at $V_1$, $V_2$, or $V_3$) occur. The positive-going spikes at $V_1$, $V_2$, and $V_3$ are now advantageous since by turning "on" transistors $T_{R1}$, $T_{R2}$, and $T_{R3}$ they cause the line capacitance associated with conductors $H_1$, $H_2$, and $H_3$ to be periodically, i.e., charged to zero volts, thereby maintaining the potential of that line at ground potential.

The H-clock pulses shown in waveform F of FIG. 4A are distributed to the pulsed row conductors at the relative times shown in FIGS. G, H, and I.

Typical signal voltage outputs at the first junction points of each row, fully described above for row 1, are shown in waveforms J, K, and L.

Waveform M illustrates the current flowing through $R_1$ corresponding to the signals appearing at $P_{11}$, $P_{21}$, and $P_{31}$.

Note that in FIG. 1 the rows of the sensor are driven by a single bipolar clock while the V-scan generator is driven by two (complementary) unipolar (with respect to −30 volts) clocks. This demonstrates that either clock method may be used to operate bucket brigade type circuits.

I claim:

1. A scan generator comprising:

N transistors each transistor having first and second electrodes defining the ends of a conduction path and a control electrode whose applied potential determines the conductivity of said path;

a capacitor per transistor, coupled between the control electrode and the second electrode of the transistor;

means connecting the conduction paths of said transistors in series between a signal input point and a terminating transistor, the first of said N transistors having its first electrode connected to said signal input point;

one output point per transistor, except for the terminating transistor, connected to the second electrode of each transistor for producing thereat an output pulse;

first and second terminals connected to receive complementary enabling signals for enabling every other transistor during a first time interval and enabling the remaining transistors during a succeeding time interval:

means for coupling said first terminal to the control electrode of every other transistor;

means for coupling said second terminal to the control electrode of the remaining transistors;

means for:

1. applying a voltage level to said signal input point having a polarity to allow conduction between the first and second electrodes of said first and succeeding transistors, when said transistors are enabled, for generating an approximately constant voltage level at each one of said output points; and 2. Selectively blocking conduction between the first and second electrodes of said first transistor, when the enabling signal applied to the control electrode of said first transistor is in a direction to turn it on, whereby said enabling signal is coupled through the capacitor connected between the control electrode and the second electrode of the first transistor for producing an output pulse at the output point of said first transistor and whereby output pulses of substantially equal amplitude and having the same polarity are then sequentially produced at each succeeding one of said output points in response to said enabling signals.

2. The combination as claimed in claim 1 wherein said transistors are insulated-gate field-effect transistors of the same conductivity type.

3. The combination as claimed in claim 2 wherein said transistors are on a common substrate.

4. The combination as claimed in claim 1 wherein the output pulses are non-overlapping, the rising edge of a given pulse being concurrent in time with the falling edge of the pulse preceeding said given pulse and the falling edge of said given pulse being concurrent in time with the rising edge of the pulse succeeding said given pulse.

5. A method for producing sequentially spaced contiguous pulses utilizing a charge transfer register comprised of N transistors, each transistor having first and second electrodes defining the ends of a conduction path and a control electrode whose applied potential determines the conductivity of said path; a capacitor per transistor coupled between the control electrode and the second electrode of the transistor; means connecting the conduction paths of said transistors in series between a signal input point and a terminating transistor, the first of said N transistors having its first electrode connected to said signal input point; one output point per transistor, except for the terminating transistor, connected to the second electrode of each transistor for producing thereat output pulses;

first and second terminals; means for coupling said first terminal to the control electrode of every other transistor; means for coupling said second terminal to the control electrode of the remaining transistors;

said method comprising the steps of: 1) applying alternating enabling segnals to said first terminal and the complement of said alternating enabling signals to said second terminal for during a first time interval enabling every other transistor and during a succeeding time interval enabling the remaining transistors; 2) applying a first voltage level to said signal input point having a polarity and magnitude to render said first transistor as well as all succeeding transistors conducting, when enabled, for producing an approximately constant voltage level at each one of said output points, and 3) selectively applying a pulse to said signal input point having a polarity and magnitude to prevent conduction in said first transistor when said first transistor is enabled for producing an output pulse at the output of said first transistors which is then sequentially propagated along succeeding output points on each alternation of said enabling signals.

* * * * *